United States Patent
Neubauer et al.

(10) Patent No.: US 6,727,614 B2
(45) Date of Patent: Apr. 27, 2004

(54) SYMMETRICAL DRIVE FOR WIPER COMPONENTS

(75) Inventors: Achim Neubauer, Sinzheim-Vormberg (DE); Jochen Moench, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/443,726

(22) Filed: May 22, 2003

(65) Prior Publication Data

US 2004/0061393 A1 Apr. 1, 2004

(30) Foreign Application Priority Data

Sep. 30, 2002 (DE) .......................................... 102 45 663

(51) Int. Cl.$^7$ ................................................. H02K 7/00
(52) U.S. Cl. .............................. 310/75; 310/83; 475/149
(58) Field of Search ................................. 310/75 R, 83, 310/82; 318/12, 40; 74/42–43; 475/332, 149

(56) References Cited

U.S. PATENT DOCUMENTS 5,723,924 A * 3/1998 Blanchet ....................... 310/85
5,886,437 A * 3/1999 Bohn et al. .................... 310/90
6,504,277 B2 * 1/2003 Uemura et al. ................ 310/77

FOREIGN PATENT DOCUMENTS

DE          196 42 667 A1    10/1997

* cited by examiner

Primary Examiner—Nicholas Ponomarenko
Assistant Examiner—Iraj A. Mohandesi
(74) Attorney, Agent, or Firm—Michael J. Striker

(57) ABSTRACT

A drive unit for wiper assemblies includes a housing (2, 3; 91) surrounding a drive motor, which is associated with a gear (13, 30, 50, 60, 80, 90), whose drive shaft (5, 40, 65, 97) drive wiper components. On the housing (2, 3; 91), a connecting point (27) for a control and regulating electronics, as well as for connecting to an on-board system of a motor vehicle and a position detector (12), are provided. The drive shaft (5, 40) lies either coaxial to the drive shaft of a rotationally symmetrical motor and drive unit (1, 30, 50, 80) or the axis of symmetry (93) of the motor and gear unit (60, 90) lies in a mirror plane (78).

16 Claims, 5 Drawing Sheets

SYMMETRICAL DRIVE FOR WIPER COMPONENTS

BACKGROUND OF THE INVENTION

On motor vehicles, wipers come into use for cleaning windshields, headlights, and mirrors. The driving of the wiper takes place typically by means of an electric drive and various types of gears that cooperate with the electric drive, such as, for example, a wiper lever system. With rear window wipers on motor vehicles, today mostly single wipers are used, while for cleaning of the front window on roadway or rail vehicles, two-armed window pane wipers are used. If two motors are used for driving the front windshield, differently designed variants are required for the drive on the driver and passengers sides of the vehicle.

DE 196 42 667 A1 relates to a bearing for a wiper drive. A wiper assembly on a motor vehicle is drive by means of a wiper drive. The wiper assembly includes a tubular sheet, which accommodates the wiper drive with a drive shaft guided in a bearing support. The wiper drive, according to this solution, is inserted with the bearing support into a tube-shaped element arranged on the tubular sheet. The tubular element is formed on the tubular sheet, whereby the bearing support of the wiper drive is plugged through the tubular sheet. The wiper drive is fixed in the circumferential direction by a force connection between the bearing supports and the tubular element on the tubular sheet; however, also a form-fitting connecting in the circumferential direction between the bearing supports and the tubular element can be used.

The tubular element can have an inner contour that deviates from a circular shape, in particular, a polygonal or non-round inner contour, which corresponds with an adapted outer contour of the bearing supports. A fixing between the bearing supports of the wiper drive and the tubular element can also take place via toothing.

The solution sown in DE 196 42 667 requires two constructively differently designed variations for the driver or passenger sides of a vehicle or a railway vehicle, as well as lever systems or linkages that are adapted to the constructively different variations, which likewise, are not mirror-symmetrical. This requires the manufacture of at least two variations of wiper linkages or lever systems or front wiper drives or headlight wiper drives for the driver and passenger sides of the vehicle.

Based on the restricted, principal-related mismatch of the drive and drive axis of a worm gear, it is necessary to make different mountings for the drive and passenger sides for this type of gear construction. In addition, worm gears required, based on the restricted mismatch of drive and drive shaft, a relatively large amount of space.

SUMMARY OF THE INVENTION

With the proposed solution according to the present invention, a wiper drive is manufactured, which allows integration in a hollow shaft. Based on the mirror-symmetrical structure of the proposed wiper drive, the drive axis of this wiper drive lies in the mirror plane or the drive axis in the center of the rotationally symmetrical component. If the drive axis of the wiper drive, in particular, is used directly for driving a wiper or a wiper arm, an extremely compactly structured direct wiper drive (WDA) exists. The mirror-symmetrical structure of the wiper drive of the present invention offers substantial advantages with regard to the required mounting space and possible savings in costs.

If two-motor wiper assemblies or the above-mentioned direct wiper drive are used, identical drives for the drive and passenger sides can be used. This means that only one component must be manufacture, labeled, stored, packaged and transported, which substantially reduces the manufacturing costs as well as the logistical costs. In particular, the vehicle body-side connection points for the rotationally or mirror symmetrical wiper drive (or also direct wiper drive) can be standardized, so that identical flange-forming bores or mounting surfaces can be provided, which are identical on the driver- or passenger-side mounting points of the wiper drive. Likewise, also the electrical connections or the electronics of the drive, connectors, control and regulating electronics, as well as the connection to the on-board supply system or the vehicle bus system (CAN-Bus) can be designed identically.

The connection concept with regard to the use of mirror-symmetrical wiper drives or direct wiper drives can be standardized, and therewith, the application construction—perhaps with the automobile manufacture—and the installation can be considerably simplified. Rationalization effects or rationalization potential with the solution proposed by the present invention are, above all to be seen, that by the use of the same designs for different drives—be it the front and back wiper, be it a headlight wiper—identical components can be accessed. With a wiper drive that operates as a rotationally symmetric component and an adaptive electronic, which optionally can include a position detector, additional simplifications upon installation can be realized with all wiper drives, since then, the position of the drive and wiper lever or another wiper arm component to another upon assembly is user-defined. This means with regard to the installation in the end assembly substantially facilitated assembly, since, on the one hand, a minimal installation and minimal cycle time can be achieved, and on the other hand, fewer installation errors can occur.

BRIEF DESCRIPTION OF THE DRAWINGS

FIGS. 1.1, 1.2 and 1.3 show a plan view, a site view, and a section representation of a rotationally symmetrical wiper drive;

FIGS. 6.1 and 6.2 show a crown wheel gear with spur gears.

DETAILED DESCRIPTION OF THE PREFERRED EMBODIMENTS

Figure 11:
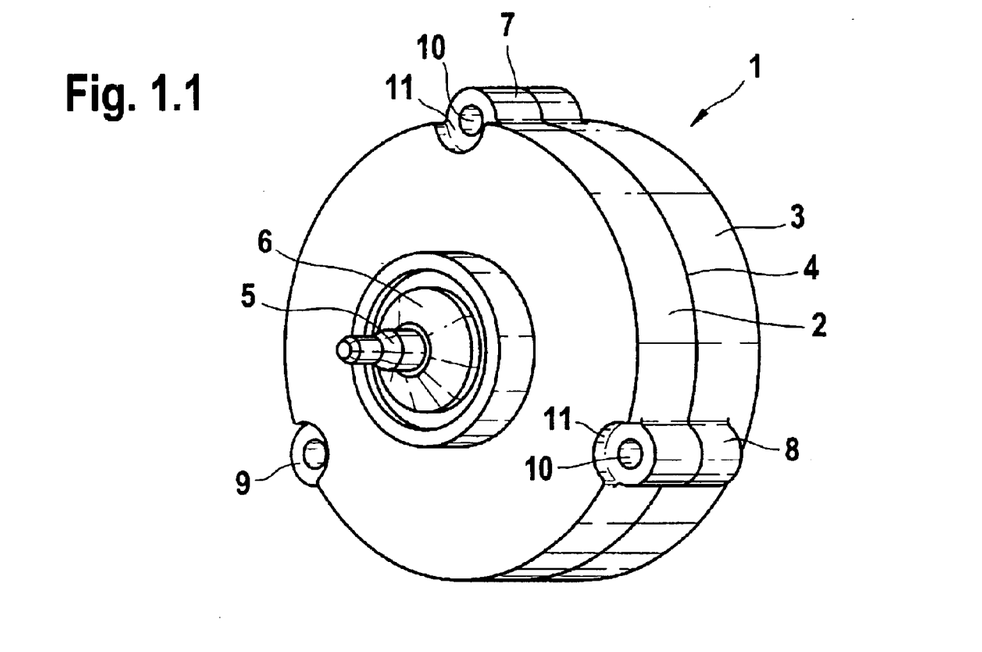
Figure 12:
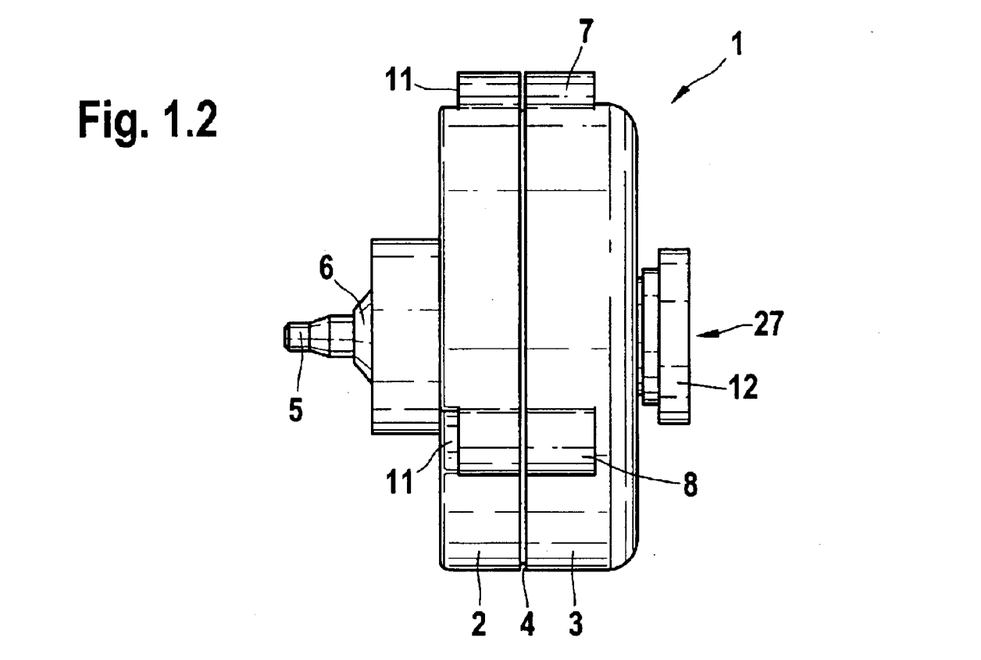
Figure 13:
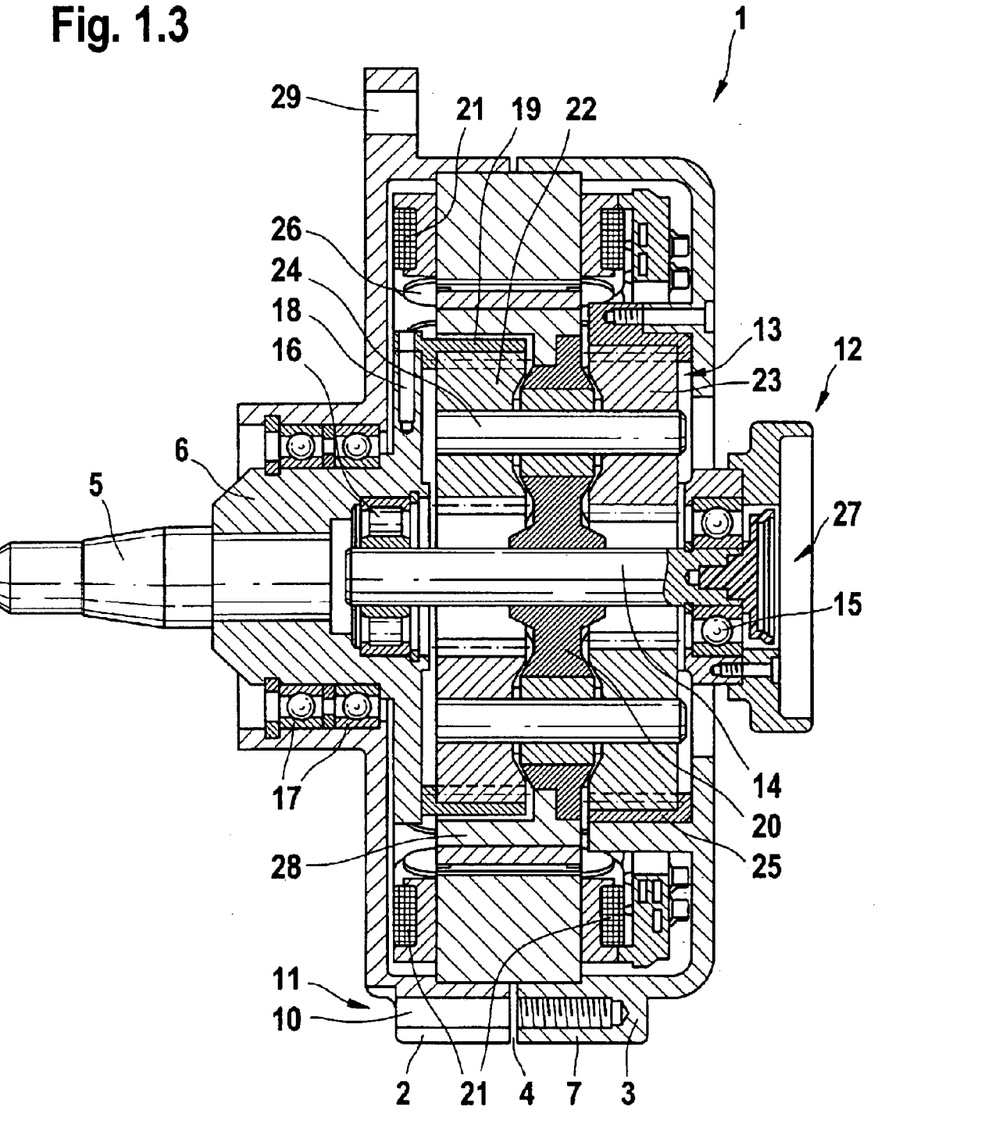

FIGS. 1.1 through 1.3 shows a plan view, a side view, and a back view of a rotationally symmetrical wiper drive.

According to this embodiment of the present invention, a rotationally symmetrically formed drive unit 1 includes a BPM motor (Brushless Permanent Magnet), with which it operates as an electronically commutated, brushless operating electric motor with permanent magnets without actuated reluctance. Electronically commutated (EC) motors are particularly interesting as rotationally symmetrical drive units 1, because alternative structures are possible, which are often interesting because of the construction space of the design. Thus, this rotationally symmetrical motor is formed relative flat with a large diameter. The electronics of such EC motors can be connected very easily with the data busses (CAN-data busses) of the motor vehicle; no additional switching expense exists. Since the EC motors, based on their construction principles, have no brushes, as a result no wear occurs on these components, which is advantageous with frequently running motors. In addition, based on the lack of brushes on this type of electrically commutated motors, no spark formation exists, which leas to abrasion, wear, and therewith to premature breakdown of the drive use to that point. Based on the use of EC motors, a spark formation is avoided. Since based on the lack of spark formation on the EC motors, no radio waves occur, EC motor also represent no source for sweep radiation. Further, based on the lack of sparking on EC motors, their electromagnetic tolerance (EMV) is substantially more favorable, compared with electrical drives having brushes.

The rotationally symmetrical drive 1 includes a first housing shell 2 and a second housing shell 3, which are connected with one another along a ring-shaped joint 4. The drive shaft of the rotationally symmetrical drive 1 is designated with reference numeral 5 and penetrates the first housing shell 2. The drive shaft 5 of the rotationally symmetrical drive unit 1 is surrounded by the hollow driving shaft 6. On the outer circumferential surface of the housing shells 2 and 3, three connecting points 7, 8, and 9 that are offset from one another by an angle of approximately 120° are arranged in the embodiment of the rotationally symmetrical drive unit 1 according to the illustration in FIG. 1.1. The connecting points 7, 8, and 9 lie respectively aligned with one another offset at an angle of 120° on the outer circumference on the first housing shell 2 and the second housing shell 3. The connecting points 7, 8, 9 each include a hole 10 as well as recesses 11 aligned to the connecting points 7, 8, 9 on the first housing shell 1.

From the side view of the rotationally symmetrical drive unit 1 according to the illustration in FIG. 1.2, it can be seen that on the back side of the second housing shell 3, a sensor element 12 is arranged. This sensor element 12 can be embodied as an AMR sensor element, for example, which simultaneously represents a rotationally symmetrically lying connecting point 27 for a control and regulating electronics, which is shown in the side view of FIG. 1.2. If the control and regulating electronics that can be connected to the rotationally symmetrical drive unit 1 are embodied as an adaptive electronics (optional with position detection), the installation of the rotationally symmetrical drive unit 1 can be further simplified, since the position of the rotationally symmetrical drive unit 1 and the position of the wiper components, for example, a wiper lever, can be combined with one another according to the user's needs. This represents a considerable facilitation for assembly upon installation, since in this manner, less installation and cycle times and fewer installation errors from determination of the position of the drive unit and wiper level to one another can be achieved.

From the side view according to FIG. 1.2 of the rotationally symmetrical drive unit 1, it can be seen that in the region of a front side of the first housing shell 1, as viewed in the circumferential direction of the first housing shell 2, contact surfaces are arranged which correspond to the connecting points 7, 8, an d9. Via these contact surfaces, a mounting of the rotationally symmetrical drive unit 1 on a dashboard or a front wall of a driver or passenger side of a motor vehicle body takes place, likewise, with interposition of a sealing element (now shown in FIG. 1.2).

FIG. 1.3 shows a sectional illustration of a rotationally symmetrical drive, which can be used as a wiper drive.

From the sectional illustration according to FIG. 1.3, it can be seen that the first housing shell 2 and the second housing shell 3 of the rotationally symmetrical drive unit 1 surround an integrated planetary gearing 13. A shaft 14 is rotatably accommodated in a first bearing 1 and a second bearing 16. The first bearing 15 is located in the second housing shell 3, while the second bearing 16 is accommodated in the interior of a hollow driving shaft 6.

On the outer surface of the first housing shell 2 and the second housing shell 3, the connecting points 7, 8, 9 shown in FIGS. 1.1 or 1.2 are located, from which here only the first connecting point 7 is shown. This includes a bore or hole 10, which extends through the first connecting point 7 into the first and into the second housing shell 1 or 3, and extends over the front face of the first housing shell 2 into a recess 11. The connecting points of the first and second housing shells that are connected to one another at the joint 4, as shown in the upper part of FIG. 1.3, can be embodied as flange bores. Corresponding to the flange formation of the rotationally symmetrical drive unit 1 according to FIG. 1.3, connecting points 29 of the rotationally symmetrical drive unit 1 can be standardized and formed identically on the drive and passenger sides of the vehicle body, which facilities assembly and further, permits a greater freedom with the manipulation of the rotationally symmetrical drive unit 1 upon its assembly in the region in which engine and passenger space of a vehicle border one another. Further, the manipulation of a rotationally symmetrical drive unit 1 is considerably improved with the assembly on a motor vehicle window.

The hollow driving shaft 6 is supported by means of a hollow shaft bearing 17 in the first housing shell 2. Via a pinned fitting 18, a first gear rim 19 is non-rotatably accommodated on the hollow driving shaft 6, which is embodied with a crown-shaped inner toothing.

The inner toothing of the first gear rim 19 meshes with first planetary pinions 22, which are provided on a planetary pinion shaft 24. The planetary pinion shaft 24 is supported in a supporting disk 20 on the shaft 14, which on its outer circumference is provided with a crown 28 with magnets which acts as a rotor. The crown 28 forms the rotor. The stator of the rotationally symmetrical drive unit 1, according to the illustration in FIG. 1.3, is formed by a non-rotatable coils 21 arranged in the interior of the first housing shell 2. On the end of the planetary pinion shaft 24 opposite the first planetary pinions 22, second planetary pinions 23 are provided, which have a somewhat enlarged diameter. The second planetary pinions 23, however, can also have a diameter corresponding to that of the first planetary pinions 23 or another diameter. The second planetary pinions 23 of the rotationally symmetrical drive unit 1 according to FIG. 1.3, mesh with a second gear rim 25 having inner teeth. The second gear rim 25, with regard to its pitch circle diameter, agrees with the respective diameter of the second planetary pinions. The second gear rim 25 is accommodated non-rotatably within the second housing shell 3. The interference ring for the hollow driving shaft 6 is designated with reference numeral 26.

According to the embodiment of the rotationally symmetrical drive unit 1 according to FIG. 1.3, the connection 27 for the control electronics is located within the sensor element 12 on the rearward front face of the second housing shell 3. This lies likewise coaxial to the axis of symmetry of the drive shaft 5 and the shaft 14 of the integrated planetary gearing 13, so that the control electronics for the rotationally symmetrical drive unit 1, according to the sectional illustration in FIG. 1.3, can be formed identically without additional expense on the driver and passenger sides.

Figure 2:
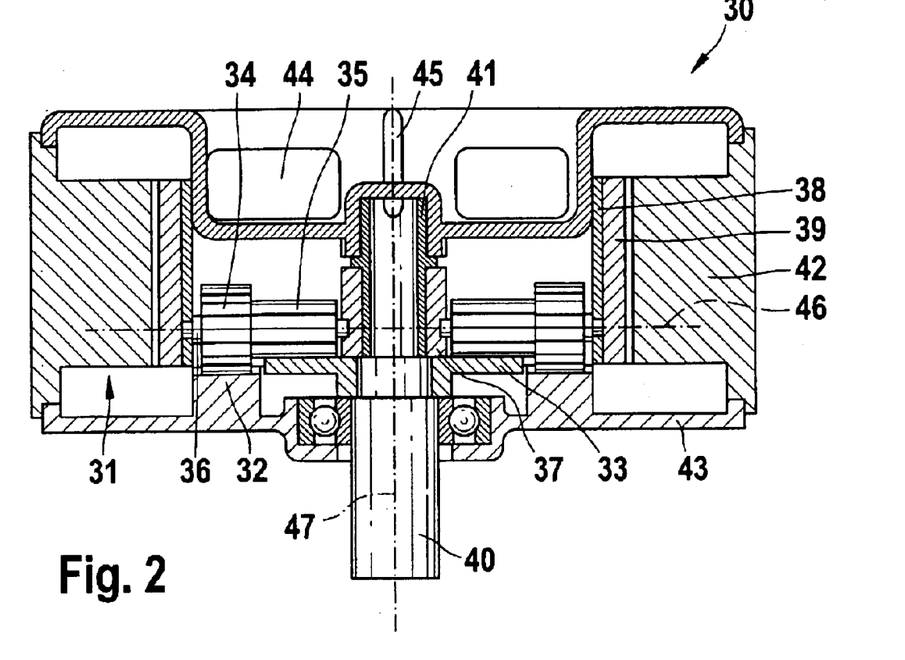
FIG. 2 shows a section through a space-saving, rotationally symmetrical planetary gearing.

FIG. 2 shows a cross section through a space-saving, rotationally symmetrical crown wheel gear.

The rotationally symmetrical drive unit 30, according to the embodiment of FIG. 2, is formed as an electric drive with an integrated planetary gearing. The planetary gearing 30 includes, according to this embodiment, a rotationally symmetrical drive unit drive unit crown wheel gear.

The planetary gearing 30 with crown wheels includes an electric drive 31. The electric drive 31 includes a stator 42, which is opposite a rotor 39. A first planetary pinion 34 and a second planetary pinion 35 are accommodated on a common planetary pinion shaft 36. The planetary pinion shaft 36, on one side, is rotatably accommodated in a liner 38 and, on the other side, in a hub 37. The first planetary pinions 34 meshes with the toothing of a first crown wheel 32, while the second planetary pinions 35 mesh with the toothing of a second crown wheel 33. The first crown wheel 32 is integrated within a housing cover 43, within which a drive shaft 40, supported by a roller bearing, is rotatably disposed. The first crown wheel 34 serves as a drive crown wheel, while the second crown wheel 33 is accommodated non-rotatably on the drive shaft 50 and is driven via the second planetary pinions 35 that act as a drive pinion and are supported on the common planetary pinion shaft 36. The second crown wheel 3 rotates with the drive rotational speed. The axis of rotation, about which the first and second planetary pinions 34 or 35 rotate, is designed with reference numeral 46, while a second axis of rotational of the drive shaft 40 that runs perpendicular to the first axis of rotation and which coincides with the axis of rotation of the second crown wheel 33, is designated with reference numeral 47. The first axis of rotation 46 coincides with the axis of symmetry of the planetary pinion shaft 36, while the second axis of rotation 47 coincides with the symmetry line of the drive shaft 40.

In a further cover element opposite the housing cover 43, control units 44 are supported. On this cover element, likewise, a cooling fin 45 is provided, while serves to conduct the existing heat. Further, a bearing sleeve 41 is provided in the further cover element, which surrounds the second axis of rotation 47.

Figure 3:
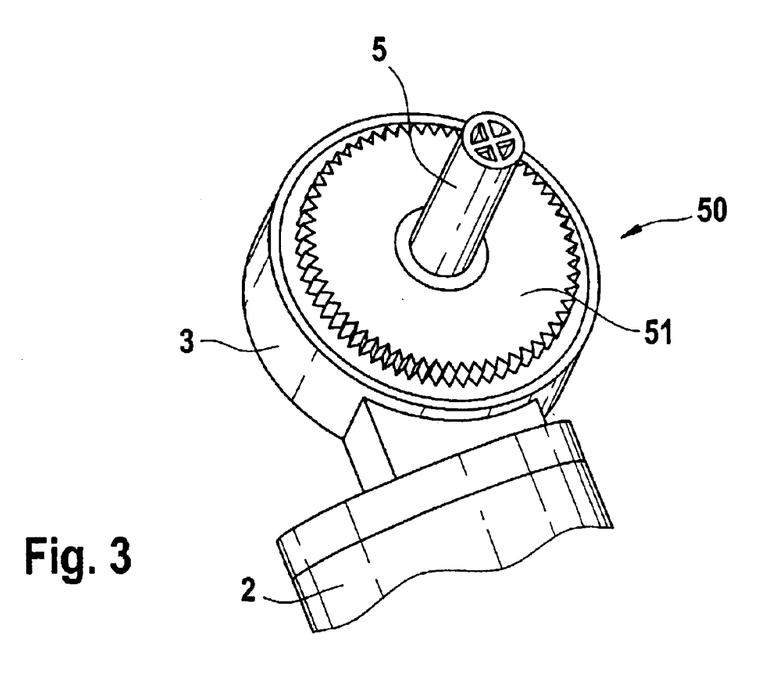
FIG. 3 shows a rotationally symmetrical shaft gear.

FIG. 3 is a schematic illustration of a rotationally symmetrical shaft gear.

In addition to the rotationally symmetrical drive unit with an integrated planetary gearing 13 shown in FIG. 1, the rotationally symmetrical drive unit 1 can include a shaft gear 50. Shaft gears 50 are suited in particular for rotationally symmetrical drives, because they themselves are symmetrically structure, whereby driving and output axes run coaxial to one another. Shaft drives 50 are very compactly built, whereby a very wide gear reduction band is made available (to approximately 1:30 to approximately 1:300). In practice, shaft drives 50 are formed to be self-locking. Also, this embodiment of a rotationally symmetrical drive unit 1 has identical connecting points on the front dashboard of a motor vehicle body and considerably increases the degree of freedom upon assembly as a wiper drive.

The shaft drive 50 according to the schematic illustration in FIG. 3 includes a drive shaft 5, which lies coaxial to the motor shaft of an electric drive (not shown in FIG. 3). The shaft drive 50 includes a first housing shell 3, as well as we second housing shell 3, whereby in FIG. 3, the first housing shell 3 is detached from the second housing shell 3. The front side of the shaft drive 50 resting on a body wall beneath the windshield of the motor vehicle is designated with reference numeral 51.

Figure 4:
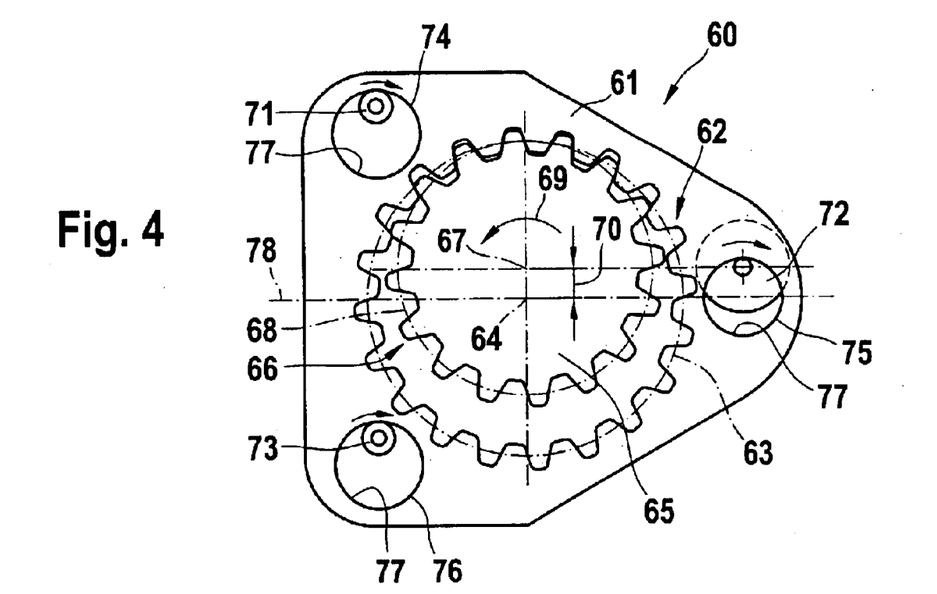
FIG. 4 is a schematic representation of a circular sliding gear with a hollow toothing, which cooperates with a drive spur gear.

FIG. 4 is a schematic illustration of a circular sliding gear with a hollow or internal gear toothing, which cooperates with an output spur gear.

A circular sliding gear 60 includes a sliding plate 61. In the sliding plate 61, a hollow or internal gear toothing 61 is provided, whose pitch circle is designated with reference numeral 63. The center of the internal gear toothing 62 in the interior of the sliding plate 61 is designated with reference numeral 64. The internal gear toothing 62 of the sliding plate 61 meshes with an output shaft 65, whose axis of rotation 67 is arranged at a distance 70 eccentric to the center 64 of the internal gear toothing 62. The rotational direction of the drive shaft 65 with reference to its axis of rotation 67 is designated with arrow 69. On the outer side of the output shaft 65, an outer toothing 66 is formed, whose pitch circle is designated with reference numeral 68.

The sliding plate 61 of the circular sliding gear 60 is moveably accommodated on a first crank 71, a second crank 72, and a third crank 73. The journals of the cranks 71, 72, 73 lies, respectively, on the inner sides 77 of openings 74, 75, 76—which are made as bores—of the sliding plate 61. The direction of rotation, in which the cranks 71, 72, 73 are moved, is designated by the arrow above the journals of the cranks 71, 72, 73 in FIG. 4. A mirror plane is designated with reference numeral 78, which runs through the enter 64 of the internal gear toothing 62 in the sliding plate 61 and runs through an eccentric axis mid-point of one of the three cranks 71, 72, 73, in this case, through the eccentric axis mid point of the second crank 72, which serves in this case as a drive crank.

With the schematically represented circular sliding gear 60 of FIG. 4, a very high gear reduction is achieved, so that the use of a direct current, or DC, motor is possible and long drive lines with a plurality of reduction components can be saved. This is favorable in view of the requirements for structural space of a wiper assembly drive beneath the windshield with applications in motor vehicles.

Figure 5:
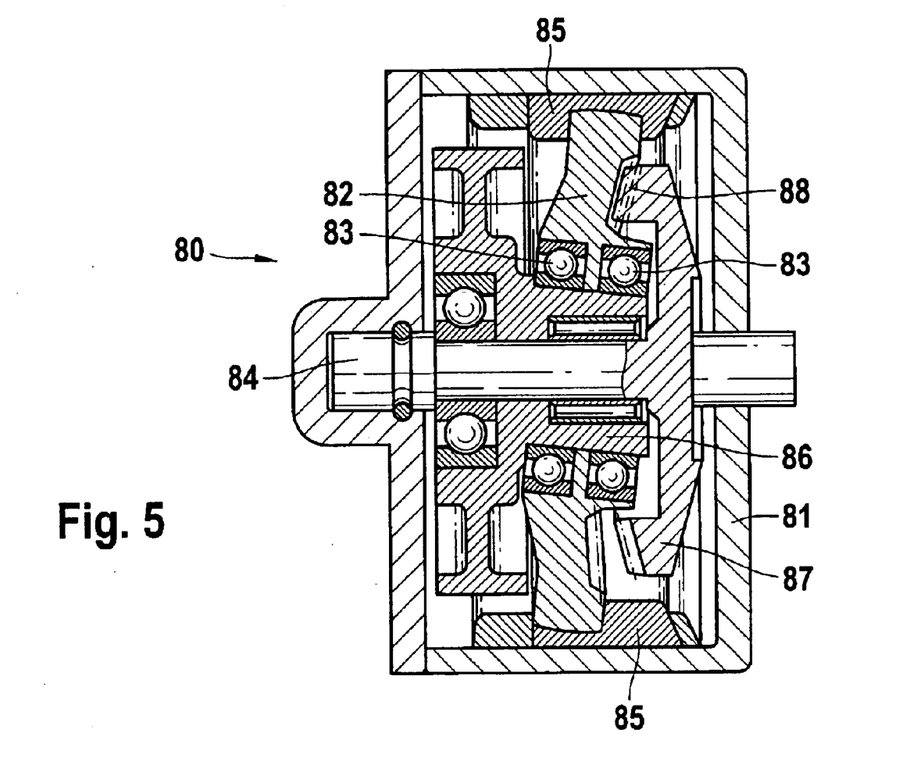
FIG. 5 shows an axial swashplate mechanism.

FIG. 5 shows an axial swashplate mechanism.

An axial swashplate mechanism, designated in FIG. 5 with reference numeral 80, includes a housing 81, which accommodates the drive components. The housing 81 of the axial swashplate mechanism 80 surrounds a swashplate 82. The swashplate 82 is guided in one side in swashplate guide 85 held in a groove, which forces the swashplate 82 into its movement. The swashplate 82, in addition, is accommodated by means of a swashplate bearing 83 on a drive 85 with an integrated, angled eccentric. The swashplate, which is formed on a front face facing an output gear 87 with a toothing, is engaged with this in a gear-tooth engagement 88, whereby the output axis 84 is moved. The axial swashplate or swash gear drive 80 has similar characteristics as a radially operating swash plate or swash gear drive. It is to be understood that the terms "swashplate" or "swash gear" drives includes axial as well as radial swashplate drives. With both embodiments of a swashplate or swash gear drive, it is mutual that they have a high power density, connected with a large reduction diversity. In addition, swash plates or swash gear drives 80 have an extremely simple structure, which makes them very robust, as well as a good efficiency. Accordingly, swash gear or swash plate drives 80 are constructed to be rotationally symmetrical, so that they can be integrated very well into the interior of an output hollow shaft 6 (compare FIG. 1.3).

Figure 61:
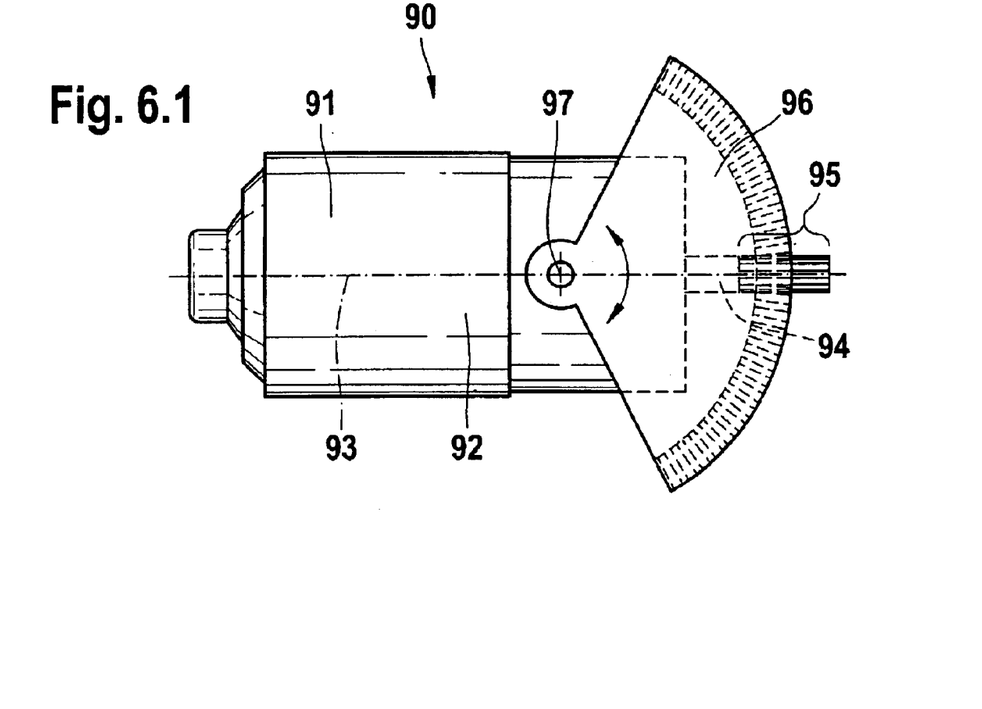
Figure 62:
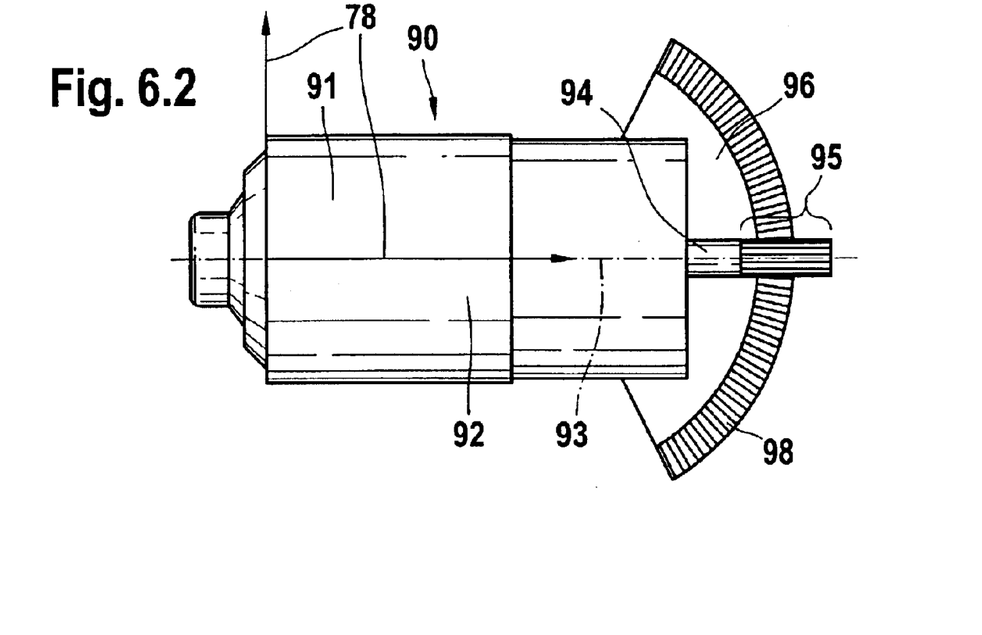

FIGS. 6.1 and 6.2 show a crown wheel gear with graduated toothing.

In this embodiment of a drive unit for wiper assemblies, a rotationally symmetrical form of a wiper assembly drive is not achieved, since the pinion shaft 95 of the electric drive 91 runs in at an angle of 90°—here, running perpendicular to the drawing plane—to the axis of rotation of a crown wheel segment 98. The crown wheel drive arrangement 90 of FIGS. 6.1 and 6.2, however, based on its compact structure, has considerable advantages compared with the use of a worm gear, on which drive and output axis likewise are arranged offset from one another at an angle of 90°. By means of the linkage of the crown wheel segment 96 directly on the housing 92 of the electric drive 91, a very compact structure is achieved. In addition, if a toothing 98 is formed on the crown wheel segment 96 as a graduated toothing, the motor/drive unit 90, 91 can be formed mirror symmetrical for the mirror plane 78 shown in FIG. 6.2. Albeit, it is not rotationally symmetrically constructed, like the motor/drive units of FIGS. 1.1, 1.2, 1.3, 2, 3, and 5, the arrangement illustrated in FIG. 6.1 or 6.2 offers a motor-drive unit for wiper assemblies the advantage that on a driver or passenger side, with reference to a dashboard beneath the mounting area of the windshield of a motor vehicle body, merely a rotation of the motor/drive unit 90 or 91 about its axis of symmetry 93 is necessary, which considerably simplifies its installation. The crown wheel gear 90 includes an electric drive 91, which can be formed as a DC motor, an asynchronous or a transverse flow motor. This is surrounded by a housing 92, which is formed to be rotationally symmetrical to the axis of symmetry 93. Based on the 90° orientation of the axis of rotation 97, which represents the output axis of the crown wheel gear 90, and the pinion shaft 94 of the electric drive 91, however, a mirror symmetrical structure of this motor/drive arrangement is achieved. The crown wheel segment 96, which pivots about the linkage point 97, which coincides with the drive shaft of the crown wheel gear 90, sweeps over a pivot angle of approximately 100° to 120°. If the crown wheel segment 96 is provided with a gear toothing 98, this is preferably formed as a graduated toothing, which meshes with the pinion 95 on the motor shaft 94.

The drive shown in FIGS. 1.1, 1.2, 1.3, 3, and 5 are essentially formed to be rotationally symmetrical. This embodiment of the wiper assembly drive of the present invention facilitates the connection to the vehicle body, since the connecting points (see positions 7, 8, and 9 in FIGS. 1.1, 1.2 and 1.3) can be easily copied. Accordingly, these can be formed identically on the drive and passenger sides beneath a windshield in the body region of a motor vehicle body. A standardized connection requires little application expense. In addition, with association of adaptive electronic components to the rotationally symmetrical drive units, the degree of freedom with referenced to a mounting of the drive relative to wiper components, such as, for example, a wiper level, substantially can be simplified, which provides a considerable reduction of installation and assembly time upon the mounting of the wiper components of a wiper assembly. In the event of the use of adaptive electronics, which can be used with the wiper drives placed in the housings 2 or 3 of FIGS. 1.1, 1.2, 1.3, 2, 3, and 5, the position of the drive unit and the wiper lever of a wiper assembly driven by this, upon assembly, is of subordinated importance, which brings with it a considerable facilitation of assembly. In addition, the rotationally symmetrical drive units, whose drive shafts 5 can be directly used to drive a wiper arm, can be used a direct wiper drive. With the use of a rotationally symmetrical drive 1 with two-motor assemblies or with direct wiper drives, the same drive can be used for the drive and passenger sides. This means that on the drive and passenger sides, the same components, the same flange forms, and the same standardized connecting points can be formed. Also, the electrical components or electronics of the drive with regard to the connection design, the control and regulating electronics, as well as the connection to the vehicle on-board network or the vehicle bus system (CAN bus) can be considerably simplified, since these interfaces as well as the used components can be designed identically.

With the embodiments shown in FIGS. 4 and 6.1 or 6.2, a mirror symmetrical arrangement of a wiper drive unit is possible, when the output axis—as shown—lies in the mirror plane 78. In this manner, a considerable simplification of the assembly of such mirror-symmetrical wiper drive units is achieved, since, for mounting on the drive or passenger sides beneath a windshield in the front area of a motor vehicle body, only a rotation of the drive units 60 or 90 about their axes of symmetry (compare 93 according to FIGS. 6.1 or 6.2) is necessary, and the various connecting components, such as, for example, connecting points for on-board network current, connecting points of the bus system (CAN data bus), control and regulating electronics, generally can be identically designed.

It will be understood that each of the elements described above, or two or more together, may also find a useful application in other types of constructions differing from the types described above.

While the invention has been illustrated and described herein as a symmetrical drive for wiper components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. Drive unit for wiper assembly with a drive motor enclosed by a housing (2, 3; 91), wherein said drive motor is associated with a gear (13, 30, 50, 60, 80, 90), whose drive shaft (5, 40, 65, 97) drives wiper components and a connection point (27) for a control and regulating electronic as well as for connecting an on-board system of a motor vehicle and a position detector (12) are provided, characterized in that the drive shaft (5, 40) lies coaxial to a motor shaft of a rotationally symmetrical motor and gear unit (1, 30, 50, 80) or a symmetrical axis (93) of the motor and gear unit (60, 90) lies in a mirror plane (78).

2. Drive unit for wiper assemblies according to claim 1, characterized in that standardized interfaces (7, 8, 9) for connection to a motor vehicle body are provided on the housing (2, 3, 91).

3. Drive unit for wiper assemblies according to claim 1, characterized in that the rotationally symmetrical motor and drive unit (1, 30, 50, 80) include electronic, commutated, brushless motors with permanent magnets and an integrated gear (13, 30, 50, 60, 80).

4. Drive unit for wiper assemblies according to claim 3, characterized in that the gear is a planetary gearing (13, 30) integrated in the housing (2, 3).

5. Drive unit for wiper assemblies according to claim 3, characterized in that the gear is a shaft gear (50) with coaxial drive and drive shaft (5).

6. Drive unit for wiper assemblies according to claim 3, characterized in that the gear is a swash-plate gear (80), which has a symmetrical structure and can be integrated in a hollow driving shaft (6).

7. Drive unit for wiper assemblies according to claim 4, characterized in that the planetary gearing (30) includes crown wheel gears (32, 33), as well as planetary pinions (34, 37) formed as pinion gears, which are accommodated on a common planetary pinion shaft (36).

8. Drive unit for wiper assemblies according to claim 1, characterized in that the gear is embodied as a circular slide gear (60) with motor/gear units (60, 90) with a drive shaft (65, 98) lying in a mirror plane (78).

9. Drive unit for wiper assemblies according to claim 8, characterized in that the circular slide gear (60) includes a hollow gear toothing (62), which meshes with a toothing on the drive shaft (65).

10. Drive unit for wiper assemblies according to claim 9, characterized in that the hollow gear toothing (62) is embodied in a sliding plate (61), which is moved by means of cranks (71, 72, 73), whose pins run on respectively associated openings (74, 75, 76) an inner side (77) from the cranks (71, 72, 73), whereby a crank (72) lying in the mirror plane (78) serves as a drive crank (4) for the sliding plate (61).

11. Drive unit for wiper assemblies according to claim 1, characterized in that the motor and drive unit include a crown wheel gear (90), whose axis of symmetry (93) lies in the mirror plane (78) of the crown wheel gear (90).

12. Drive unit for wiper assemblies according to claim 1, characterized in that the gear (13) is accommodated in the hollow driving shaft (6) of a drive motor.

13. Drive unit for wiper assemblies according to claim 1, characterized in that the electrical drive is a direct current motor.

14. Drive unit for wiper assemblies according to claim 1, characterized in that the electrical drive is an asynchronous motor.

15. Drive unit for wiper assemblies according to claim 1, characterized in that the electrical drive is a transverse flow motor.

16. Drive unit for wiper assemblies according to claim 1, characterized in that on the rotationally symmetrical motor and gear unit (1, 30, 50, 80, 90), the connecting point (27) for the control electronic coincides with an axis of symmetry (93) of the rotationally symmetrical motor and gear unit (1, 30, 50, 80, 90).

\* \* \* \* \*